United States Patent [19]

Garland

[11] Patent Number: 4,596,086
[45] Date of Patent: Jun. 24, 1986

[54] WEED GUARD AND FISHING JIG INCORPORATING SAME

[76] Inventor: Garry L. Garland, 3799 Stirrup Dr., Kingman, Ariz. 86401

[21] Appl. No.: 800,312

[22] Filed: Nov. 21, 1985

[51] Int. Cl.$^4$ ............................................ A01K 97/00
[52] U.S. Cl. .................................................... 43/42.4
[58] Field of Search .................... 43/42.1, 42.26, 42.42, 43/43.4, 43.6, 42.52, 42.25, 42.2, 43.1, 42.24, 42.28, 42.4, 42.41, 42.43

[56] References Cited

U.S. PATENT DOCUMENTS

| | | | |
|---|---|---|---|
| 2,332,400 | 10/1943 | Richardson | 43/39 |
| 3,670,446 | 6/1972 | Wheeler | 43/42.43 |
| 3,802,747 | 4/1974 | Cartwright | 43/42.28 |
| 4,137,664 | 2/1979 | Beres | 43/43.1 |
| 4,333,402 | 2/1984 | Steeve | 43/43.2 |

FOREIGN PATENT DOCUMENTS 546756  9/1922  France ............................... 43/42.40

OTHER PUBLICATIONS

Webster's New International Dictionary, 2nd Ed., Unabridged, pp. 2729 and 2730.
Bassmaster Magazine, "Pro's Pointers", Jul./Aug. 1984. p. 30.
West Coast Magazine, "I Like to Play with Spiders", Stan Fagerston, pp. 7 & 8.
"How to Rig Your Plastic Worm" published by M-F Manufacturing Company, Inc.
Advertisement for "Weedless Crappie Slider" by Charlie Brewer's Slider Company of Lawrenceburg, Tennessee.
Advertisement Regarding "Free Weeder" Lures by Otter Ponds Tackle Co. of Niles, Illinois.
Advertisement Depicting "Weedless Grub and Worm Heads".
Advertisement for "Uncle Buck's Buck N' Rubber Bass Jigs".
Advertisement for Uncle Buck's Best Bass Bug".

Primary Examiner—Nicholas P. Godici
Assistant Examiner—G. M. Reid
Attorney, Agent, or Firm—Cahill, Sutton & Thomas

[57] ABSTRACT

A weed guard for incorporation within a fishing jig includes an elongated flexible plastic member having a generally rounded and substantially flattened head portion at one end thereof and a generally cylindrical portion at the opposite end thereof interconnected by a central neck portion. The flattened head has a central bore formed therein and extending perpendicular to the flattened surfaces thereof for allowing the flattened head to be passed over and around the barbed tip of the fishing jig and positioned proximate to the leadhead of the fishing jig. A conventional soft plasic skirt is thereafter installed on the fishing jig. The cylindrical end of the elongated plastic member terminates in a blunt end into which the barbed tip of the jig is engaged to prevent the hook from snagging weeds or other submerged debris. The central neck portion of the elongated plastic member is reduced in width to facilitate the bending of the elongated plastic member along the central neck portion.

6 Claims, 5 Drawing Figures

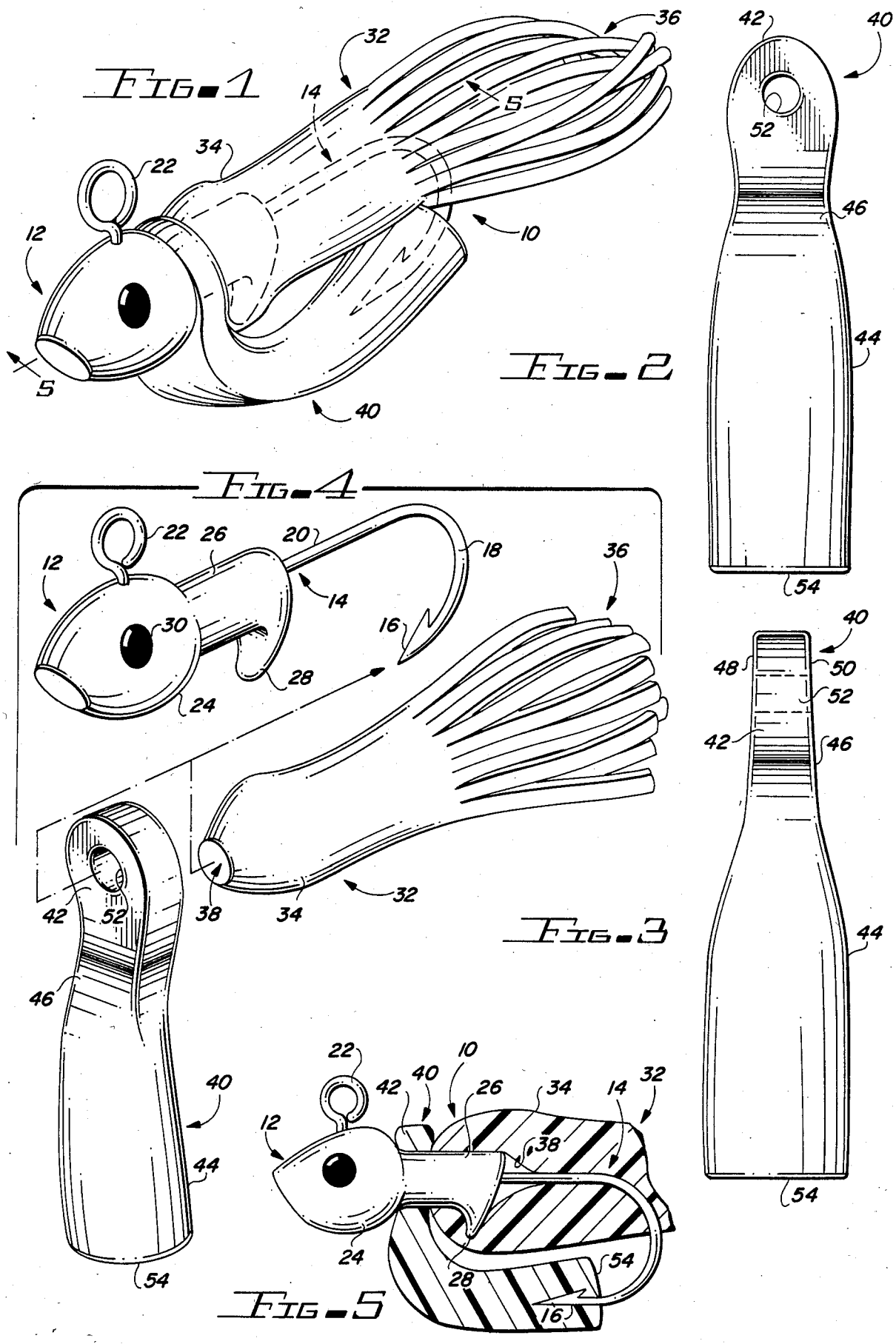

WEED GUARD AND FISHING JIG INCORPORATING SAME

BACKGROUND OF THE INVENTION

1. Field of the Invention

The present invention generally relates to so-called weedless fishing jigs and so-called weed guards for use with fishing jigs, and more particularly, to a weed guard which may be easily and conveniently incorporated within a fishing jig without requiring substantial changes in the process used to manufacture such jigs.

2. Description of the Prior Art

While a wide variety of natural bait and artificial lures are used by fishermen to catch fish, the fishing jig is particularly popular among fishermen trying to catch bass, crappie, and walleye. Such fishing jigs are typically formed by molding a lead head portion, or leadhead, around the upper end of a jig style hook, leaving the eyelet of the hook protruding from the leadhead for attachment to the fishing line. A soft plastic skirt or body having a longitudinal bore formed therethrough is passed over and around the barbed tip of the jig hook proximate the leadhead. The leadhead is typically formed with a projection or "keeper" extending at an angle therefrom, and the plastic skirt is engaged over the keeper to prevent the skirt from sliding down the shaft of the hook away from the leadhead. Dots resembling eyes may also be painted on opposing sides of the leadhead to make the jig appear more like a living creature. The plastic skirt typically includes soft plastic trailing members which "jiggle" as the jig passes through the water. Occasionally, rubber, feathers and/or animal hair are used to ornament the jig in place of the plastic skirt described above.

Because species of bass, crappie, walleye and other fish often swim near the bottom of a lake or in shallow waters covered by submerged branches and other debris, many fishermen attempt to position such fishing jigs near the bottom of the lake, or in such covered shallow waters. However, because of submerged weeds, branches and other debris, such fishing jigs often become snagged; in such instances, the fishing line may break as the fisherman attempts to retrieve the line, or the fisherman is forced to cut the line in order to free the same.

In view of the inconvenience and time required to secure a new jig to the end of the fishing line each time a jig becomes snagged, manufacturers of fishing jigs have made various attempts to modify the basic design of the fishing jig to render the same weedless. One presently popular accessory used by fishing jig manufacturers to render fishing jigs weedless is a so-called "Y-GUARD" available from Billy Henry, Inc. of Crystalake, Ill. The Y-GUARD is typically formed of plastic and includes a central thickened shaft from which extend two thin flexible fingers whereby the device resembles the shape of the letter Y. The thickened shaft is inserted into the leadhead mold prior to molding the leadhead, with the flexible fingers extending generally toward and on either side of the tip of the jig hook. The flexible fingers extending generally toward the tip of the jig hook are designed to deflect weeds, branches or other submerged debris, while being flexible enough to yield to the jaws of a fish when the fish strikes the jig. Another popular method of rendering a fishing jig weedless is by the incorporation of a so-called fiber guard. Fiber guards consist of a plurality of monofilament fibers of the type commercially available from DuPont Corporation under the brand name "HEROX", which fibers are commonly joined at one end; the joined end of the plurality of fibers is inserted into the leadhead mold prior to molding the leadhead with the free ends of the fibers projecting generally toward and slightly ahead of the tip of the jig hook. Once again, the fibers tend to ward off weeds, branches or other submerged debris while being flexible enough to yield to the jaws of a fish.

While both the Y-guard and fiber guard described above serve to lessen the likelihood of a fishing jig becoming snagged, such fishing jigs are more difficult to manufacture and assemble since the Y-guard or fiber guard must be properly positioned within the mold during the process of molding the leadhead. Due to such complications, the number of leadheads which can be molded at the same time is limited as compared with the number of leadheads which can be practically molded when such weed guards are omitted. Furthermore, the use of such weed guards is limited to those types of fishing lures which include molded leadheads.

Yet another approach known in the art to provide a weedless fishing jig is commercially available under the brand name "CRAPPIE SLIDER" from Charlie Brewer's Slider Company of Lawrenceburg, Tenn. wherein a non-conventional jig head is provided along with a soft plastic grub body to ornament the jig. The forwardmost end of the grub body is advanced over the tip of the hook and around the shaft of the hook toward the jig head. The tip of the hook is then inserted in the central portion of the grub body, while the tail of the grub body trails behind. While such a construction provides a weedless fishing jig, the specially designed jig head and grub body differ from and appear to be incompatible with conventional jig heads and ornamental skirts preferred by many fishermen to catch other species of fish.

Accordingly, it is an object of the present invention to provide a weed guard for a fishing jig which is easily and conveniently incorporated within a conventional fishing jig without altering the process normally used to mold the leadhead about the jig hook.

Another object of the present invention is to provide such a weed guard for a fishing jig which is easily and conveniently incorporated within a conventional fishing jig after the leadhead molding process has been completed.

Still another object of the present invention is to provide such a weed guard which is compatible both with conventional jig heads and with conventional jig skirts and other ornamentation conventionally applied to such jigs.

A further object of the present invention is to provide a fishing jig which incorporates a weed guard of the type described above.

These and other objects of the present invention will become more apparent to those skilled in the art as the description thereof proceeds.

SUMMARY OF THE INVENTION

Briefly described, and in accordance with one embodiment thereof, the present invention relates to a weed guard for use with a fishing jig, the weed guard having the form of a soft plastic elongated member having a substantially flattened head portion at one end thereof and an enlarged cylindrical portion at a second end thereof opposite the flattened head portion. The flattened head portion has a central bore formed therein and substantially perpendicular thereto for permitting the flattened head portion to be passed over and around the barbed tip of the jig hook of the fishing jig. The flattened head portion is passed along the jig hook and positioned adjacent the leadhead of the fishing jig prior to installation of the skirt or other ornamentation normally used to dress the fishing jig. The cylindrical portion of the elongated plastic member includes a blunt end for being pierced by the barbed tip of the jig hook, the cylindrical portion thereby receiving the barbed tip and allowing the same to become embedded therein to prevent weeds, branches and other submerged debris from snagging thereon. The elongated plastic member is designed to be soft and pliable enough to permit the barbed tip to pass fully through and exit such cylindrical portion when the fishing jig is bitten by a fish. Assembly of the fishing jig is completed by installing the conventional plastic skirt or other ornamentation over the jig hook in the normal manner whereby the flattened head portion of the elongated plastic member fits directly between the leadhead and the plastic skirt.

The flattened head portion and the opposing cylindrical portion of the elongated plastic member are joined by a central neck portion which is preferably of reduced width relative to the flattened head portion and cylindrical portion to facilitate bending of the elongated member along the central neck portion, thereby allowing the cylindrical portion to be directed toward and engage the barbed tip of the fishing jig.

When the described weed guard is used in conjunction with a fishing jig of the type including a projecting retaining member, or keeper, molded into the leadhead, the flattened head portion of the elongated plastic member is guided over and around the keeper prior to installation of the plastic skirt in order to maintain the flattened head portion proximate to the leadhead.

The present invention also includes a weedless fishing jig of the type which incorporates a weed guard assembled upon the fishing jig in the manner immediately described above.

BRIEF DESCRIPTION OF THE DRAWINGS

FIG. 1 is a perspective view of a fishing jig of the type used to catch bass and other species of fish, to which has been added a weed guard of the type forming the present invention.

FIG. 2 is a front view of the weed guard shown in FIG. 1 prior to assembly upon the fishing jig shown in FIG. 1.

FIG. 3 is a side view of the weed guard shown in FIG. 2.

FIG. 4 is an exploded view of the fishing jig shown in FIG. 1, including a conventional leadhead and jig hook, plastic skirt, and the novel weed guard.

FIG. 5 is a cross-sectional view of the weedless fishing jig shown in FIG. 1 and taken through lines 5—5 as shown in FIG. 1.

DETAILED DESCRIPTION OF THE PREFERRED EMBODIMENT

FIG. 1 illustrates a fishing jig which has been made weedless through the incorporation of a weed guard according to the teachings of the present invention. The fishing jig illustrated in FIG. 1 is designated generally by reference numeral 10. Fishing jig 10 is of a general type long used by fishermen in various weights and sizes for catching bass, crappie, walleye, trout and other pan fish, except that such fishing jigs which have previously been in use have lacked a weed guard of the type described herein. Fishing jigs of such general type, but lacking the weed guard of the present invention, have long been commercially available from such firms as Canyon Lures, Inc. of Kingman, Ariz. under the trademark "MINI JIGS".

Prior to describing the novel weed guard of the present invention and the manner by which it is incorporated into fishing jig 10, it will first be helpful to briefly review the manner in which conventional fishing jigs have been manufactured in the past. With reference to FIG. 4, conventional fishing jigs are formed by molding a leadhead, designated generally by reference numeral 12, over a jig hook, designated generally by reference numeral 14. The jig hook includes a barbed tip 16, a curved base portion 18, a central shaft 20, and an eyelet 22 protruding from leadhead 12. Prior to the process of molding leadhead 12, the end of central shaft 20 opposite curved base portion 18 is bent at a right angle for allowing eyelet 22 to extend perpendicularly from central shaft 20. Eyelet 22 is provided to facilitate the coupling of the fishing jig to a fishing line.

Leadhead 12 is formed by placing eyelet end 22 of jig hook 14 into a mold and subsequently filling the mold with molten lead. The mold is allowed to cool, and jig hook 14 is thereafter removed from the mold with leadhead 12 molded thereabout. As shown in FIG. 4 and FIG. 5, leadhead 12 includes a forwardmost rounded head 24 and a rearwardly extending cylindrical portion 26 of lesser diameter than enlarged head 24. A retaining member or keeper 28 projects outwardly and forwardly from the rearmost end of tubular portion 26. Black dots, such as that identified by reference numeral 30, may be painted on either side of rounded head portion 24 to resemble eyes and to cause the fully assembled fishing jig to appear more lifelike.

Also shown in FIG. 3 is a flexible plastic skirt, designated generally by reference numeral 32 including a cylindrical body portion 34 terminating in a plurality of soft plastic trailers 36 which jiggle in the water as fishing jig 10 passes therethrough. A central longitudinal bore 38 extends through skirt 32 to facilitate the assembly of skirt 32 upon leadhead 12. As indicated by the dashed lines shown in FIG. 3, the frontmost end of skirt 32 is passed over and around barbed tip 16 of jig hook 14 for allowing barbed tip 16 to pass completely through longitudinal bore 38 of skirt 32. Cylindrical portion 34 of skirt 32 is advanced past barbed tip 16, along curved base portion 18, and thereafter along central shaft 20 of jig hook 14. The frontmost end of cylindrical portion 34 is then forced over keeper 28 to retain skirt 32 upon cylindrical portion 26 of leadhead 12. The cross-sectional view of FIG. 5 more clearly illustrates the manner by which keeper 28 engages and retains cylindrical portion 34 of skirt 32 upon leadhead 12. While the ornamentation shown in FIGS. 1, 4 and 5 is in the form of a soft plastic skirt, other forms of ornamentation, such as rubber, animal hair and/or feathers, are also used to dress a jig head in a manner to attract fish thereto.

The description of the drawings thus far explains the general procedure by which a common form of fishing jig is manufactured without any form of weed guard to prevent barbed tip 16 from becoming snagged upon weeds, branches or other submerged debris. As explained above, the present invention relates to the incorporation of a simple and inexpensive weed guard within such a fishing jig in a manner which does not substantially alter or complicate the aforementioned assembly process, and the description below will now be directed to such a weed guard.

Referring simultaneously to FIGS. 2–4, a weed guard of the type embodying the present invention is designated generally by reference numeral 40. As shown in the drawings, weed guard 40 is provided in the form of a soft plastic elongated member including a substantially flattened head portion 42, an enlarged cylindrical portion 44 opposite flattened head portion 42, and a central neck portion 46 coupling flattened head portion 42 to enlarged cylindrical portion 44. Flattened head portion 42 of weed guard 40 has a pair of opposing, generally planar surfaces 48 and 50. Flattened head portion 42 is generally rounded and of a diameter commensurate with the rounded head portion 24 of leadhead 12. A central bore 52 extends completely through flattened head portion 42 substantially perpendicular to planar surfaces 48 and 50 thereof. The diameter of central bore 52 is somewhat smaller than the diameter of cylindrical portion 26 of leadhead 12.

Still referring to FIGS. 2–4, the enlarged cylindrical portion 44 of weed guard 40 terminates in a blunt end 54. As shown in FIG. 2, central neck portion 46 is of reduced width relative to the width of flattened head portion 42 and relative to the diameter of enlarged tubular portion 44 in order to facilitate the bending of weed guard 40 along central neck portion 46, the reasons for which will become apparent from the description below.

As mentioned above, weed guard 40 is preferably made of a soft plastic material, such as the type commercially available from Lure Craft of Indiana under the brand name "PLASTISOL"; such plastic material is sold in liquid form and is heated in a pot to cause such material to thicken. A color dye may be added to the heating pot to add a desired color to such material. After such material has been heated, it is introduced into a plastic injection mold under pressure to provide weed guard 40.

The manner by which weed guard 40 is incorporated within fishing jig 10 is now described. As shown in FIG. 4, flattened head portion 42 of weed guard 40 is position adjacent barbed tip 16 for permitting barbed tip 16 to pass through central bore 52 of flattened head portion 42. Flattened head portion 42 is thereby permitted to be passed over and around barbed tip 16, along curved base portion 18, and along central shaft 20 of jig hook 14. Flattened head portion 42 is then forcibly advanced over keeper 28 and onto cylindrical portion 26 of leadhead 12 in order to position flattened head portion 42 of weed guard 40 proximate to rounded head 24 of leadhead 12, as shown in FIG. 5. Flattened head portion 42, and planar surfaces 48 and 50 thereof, extend substantially perpendicular to central shaft 20 of jig hook 14. Following installation of weed guard 40 upon leadhead 12 as described above, plastic skirt 32 is installed upon the jig head in the conventional manner. As shown in FIG. 5, the forwardmost end of plastic skirt 32 is advanced over and around keeper 28 and advanced toward rounded head 24 of leadhead 12 such that flattened head portion 42 of weed guard 40 is positioned directly between plastic skirt 32 and rounded head portion 24.

Following the assembly of fishing jig 10 as described above, cylindrical portion 44 of weed guard 40 is directed toward barbed tip 16. Reduced width neck portion 46 of weed guard 40 facilitates the bending of weed guard 40 therealong for allowing cylindrical portion 44 to be directed toward barbed tip 16. Cylindrical portion 44 of weed guard 40 extends for a sufficient length to permit a user to engage barbed tip 16 against blunt end 54 and to pierce barbed tip 16 into cylindrical portion 44, causing barbed tip 16 to become embedded within cylindrical portion 44, as shown in FIGS. 1 and 5. Because barbed tip 16 is safely embedded within weed guard 40, fishing jig 10 will not become snagged upon weeds, branches or other submerged debris. However, the plastic material from which weed guard 40 is made is soft and pliable enough to permit barbed tip 16 to pass fully therethrough and exit therefrom when fishing jig 10 is bitten by a fish, thereby allowing barbed tip 16 to hook the fish.

It will now be appreciated that a weed guard has been described which may easily and inexpensively be incorporated within a fishing jig to render the fishing jig weedless without substantially altering the process used to assemble such fishing jigs. It will be further appreciated that a weedless fishing jig has been described incorporating such a novel weed guard. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A weed guard for use with a fishing jig of the type having a leadhead and having a barbed hook opposite the leadhead to catch fish, the barbed hook having a curved base portion terminating in a barbed tip, said weed guard protecting the barbed tip from weeds, branches and other submerged debris, said weed guard comprising:
    (a) an elongated flexible plastic member having first and second opposing ends joined by a central neck portion;
    (b) the first end of said plastic member forming a generally rounded and substantially flattened head having a pair of opposing generally planar surfaces, said flattened head having a central bore formed therein and extending substantially perpendicular to said generally planar surfaces, the central bore allowing the barbed hook of the fishing jig to be passed therethrough and facilitating the positioning of said flattened head adjacent the leadhead of the fishing jig with said generally planar surfaces extending substantially perpendicular to the shaft of the barbed hook passing therethrough;
    (c) the second end of said plastic member being of generally cylindrical shape and terminating in a blunt end portion, said second end extending for a sufficient length to permit said blunt end portion to receive the Cbarbed tip, thereby preventing the barbed tip from snagging weeds, branches and other submerged debris; and
    (d) said elongated flexible plastic member being soft and pliable enough to permit said barbed tip to pass fully through and exit the second end of said plastic member when the barbed hook is bitten by a fish.

2. A weed guard as described by claim 1, wherein said central neck portion is reduced in width relative to the width of said flattened head and relative to the diameter of said second end of said plastic member to facilitate the bending of said plastic member along said central neck portion.

3. A weedless fishing jig comprising in combination:
  (a) a jig head including a jig hook having a barbed tip at one end thereof and an eyelet at an opposing end thereof, said jig head including a leadhead formed upon said jig hook proximate the eyelet end thereof;
  (b) a soft plastic skirt having a cylindrical body portion and a bore formed longitudinally therethrough for allowing said skirt to be passed over and around the barbed tip of said jig hook and along said jig hook to position said skirt substantially adjacent said leadhead with the barbed tip of said jig hook exposed; and
  (c) a weed guard in the form of a soft plastic elongated member including a substantially flattened head portion having a central bore formed therein perpendicular thereto for permitting said flattened head portion of said elongated member to be passed over and around the barbed tip of said jig hook and along said jig hook before installing said skirt thereon in order to position said flattened head portion directly adjacent said leadhead perpendicular to said jig hook and directly between said leadhead and said skirt, said elongated member further including an enlarged cylindrical portion opposite said flattened head portion, said cylindrical portion terminating in a blunt end for being pierced by the barbed tip of said jig hook, said elongated member extending for a sufficient length to permit the barbed tip of said jig hook to become embedded therein to protect the barbed tip from weeds, branches, and other submerged debris.

4. A weedless fishing jig as described by claim 3 wherein said leadhead includes a forwardly directed keeper member projecting outwardly from said leadhead to retain said skirt therein, said flattened head portion of said elongated member being passed over and around said keeper member to retain said flattened head portion proximate to said leadhead.

5. A weedless fishing jig as described by claim 3 wherein said flattened head portion of said elongated member is generally rounded and of a diameter commensurate with the diameter of said leadhead.

6. A weedless fishing jig as described by claim 3 wherein said elongated member includes a central neck portion coupling said flattened head portion to said enlarged cylindrical portion, said central neck portion being of reduced width relative to said flattened head portion and to said enlarged cylindrical portion to facilitate the bending of said elongated member along said central neck portion.

* * * * *